United States Patent
Kawaguchi et al.

(10) Patent No.: US 7,824,584 B2
(45) Date of Patent: Nov. 2, 2010

(54) METHOD OF MANUFACTURING STAMPER, METHOD OF MANUFACTURING RESIN MOLDED ARTICLE, AND STAMPER

(75) Inventors: Yuuichi Kawaguchi, Tokyo (JP); Shuichi Okawa, Tokyo (JP); Katsumichi Tagami, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/435,465

(22) Filed: May 5, 2009

(65) Prior Publication Data
US 2009/0286045 A1 Nov. 19, 2009

(30) Foreign Application Priority Data
May 14, 2008 (JP) .............................. 2008-127232

(51) Int. Cl.
*B32B 3/00* (2006.01)
*G11B 7/26* (2006.01)

(52) U.S. Cl. ..................... 264/1.33; 264/219; 425/810; 430/320

(58) Field of Classification Search ................ 264/1.33, 264/219; 425/810; 430/320, 321
See application file for complete search history.

(56) References Cited

U.S. PATENT DOCUMENTS

| | | | |
|---|---|---|---|
| 2,530,842 A * | 11/1950 | Ruggieri ....................... 205/68 |
| 5,335,526 A * | 8/1994 | Garrison et al. ................ 72/47 |
| 5,783,371 A * | 7/1998 | Bifano ......................... 430/321 |
| 6,190,838 B1* | 2/2001 | Kerfeld ........................ 430/320 |
| 6,616,867 B2* | 9/2003 | Kerfeld ........................ 264/1.33 |
| 2005/0118534 A1* | 6/2005 | Oyake et al. .................. 430/321 |
| 2005/0138803 A1* | 6/2005 | Okawa et al. .................. 425/810 |

FOREIGN PATENT DOCUMENTS

JP 2002-92984 3/2002

* cited by examiner

*Primary Examiner*—Jill L Heitbrink
(74) *Attorney, Agent, or Firm*—Greenblum & Bernstein, P.L.C.

(57) ABSTRACT

A stamper manufacturing method comprises: forming a stamper body so as to have a concave/convex pattern on one surface and a crystalline structure on at least a side toward the other surface; forming a layer having an amorphous structure on the other surface side of the stamper body; and polishing a surface of the layer having the amorphous structure. A resin molded article manufacturing method includes an injection molding process using the stamper as a prototype so as to transfer the concave/convex pattern of the stamper to a resin material. A stamper comprises a stamper body which is formed so as to have a concave/convex pattern on one surface and have a crystalline structure on at least a side toward the other surface. In the stamper, a layer having an amorphous structure and a surface of which is polished is formed on the other surface side of the stamper body.

5 Claims, 7 Drawing Sheets

F I G. 1 5

| | ELECTROLYTIC PLATING CONDITIONS | | | ELECTROLESS PLATING CONDITIONS | | POLISHING CONDITIONS | SURFACE ROUGHNESS OF BACK SURFACE Ra | AMOUNT OF WARPAGE |
|---|---|---|---|---|---|---|---|---|
| | CURRENT DENSITY [A/dm²] | PROCESSING TIME [h] | THICKNESS [μm] | PROCESSING TIME [min] | THICKNESS [μm] | PROCESSING TIME [min] | [nm] | [μm] |
| Example 1 | 10.0 | 3.0 | 300 | 3 | 1 | 20 | 11.0 | 50 |
| Example 2 | 10.0 | 3.0 | 300 | 5 | 2 | 20 | 5.7 | 50 |
| Example 3 | 10.0 | 3.0 | 300 | 15 | 5 | 20 | 4.8 | 50 |
| Example 4 | 10.0 | 2.9 | 290 | 20 | 10 | 20 | 2.1 | 70 |
| Example 5 | 10.0 | 2.8 | 280 | 60 | 20 | 20 | 2.9 | 90 |
| Example 6 | 10.0 | 2.8 | 280 | 120 | 25 | 20 | 3.5 | 100 |
| Example 7 | 10.0 | 2.7 | 270 | 180 | 30 | 20 | 3.8 | 120 |
| Example 8 | 10.0 | 2.7 | 270 | 300 | 35 | 20 | 4.1 | 260 |
| Example 9 | 10.0 | 2.6 | 260 | 450 | 40 | 20 | 4.3 | 500 |
| Comparative Example 1 | 10.0 | 3.0 | 300 | | | 20 | 20.1 | — |
| Comparative Example 2 | 10.0 | 3.0 | 300 | | | 40 | 18.2 | — |
| Comparative Example 3 | 10.0 | 3.0 | 300 | | | 60 | 17.2 | — |
| Comparative Example 4 | 10.0 | 3.0 | 300 | | | 80 | 17.0 | — |
| Comparative Example 5 | 5.0 | 6.0 | 300 | | | 20 | 10.1 | — |
| Comparative Example 6 | 2.0 | 15.0 | 300 | | | 20 | 6.2 | — |
| Comparative Example 7 | 1.0 | 30.0 | 300 | | | 20 | 6.1 | — |

US 7,824,584 B2

METHOD OF MANUFACTURING STAMPER, METHOD OF MANUFACTURING RESIN MOLDED ARTICLE, AND STAMPER

BACKGROUND OF THE INVENTION

1. Field of the Invention

The present invention relates to a method of manufacturing a stamper for use in manufacturing an information recording medium, such as a magnetic disk, a stamper, and a method of manufacturing a resin molded article.

2. Description of the Related Art

As a stamper-manufacturing method of this kind, Japanese Laid-Open Patent Publication (Kokai) No. 2002-92984 discloses a method of manufacturing a stamper which is used as a prototype when a plastic substrate for an optical disc is manufactured by injection molding. In the stamper-manufacturing method, first, an NiP thin film having a thickness of approximately 70 nm is formed by an electroless plating process on a glass master disk formed with a concave/convex pattern for manufacturing a stamper (a surface formed with the concave/convex pattern). Then, an electrolytic plating process is carried out using the formed NiP thin film as a conductive film, whereby an Ni layer having a thickness of approximately 300 μm is formed on the NiP thin film. Next, a polishing process is carried out on the back surface of the formed Ni layer (surface of the Ni layer opposite from the glass master disk) to thereby planarize the back surface. Subsequently, the laminate of the NiP thin film and the Ni layer is removed from the glass master disk, and is then punched out into a predetermined size. This completes a nickel stamper for use in injection molding. Thereafter, the stamper thus produced is set in an injection molding machine, and an injection molding process is carried out, whereby the plastic substrate for an optical disc is manufactured.

SUMMARY OF THE INVENTION

From the study of the above-described conventional method of manufacturing a stamper, the present inventors found out the following problems: In the conventional manufacturing method, the electrolytic plating process is carried out using the NiP thin film formed on the glass master disk, as a conductive film, whereby the Ni layer is formed. Then, the back surface of the formed Ni layer is polished to planarize the same whereby the nickel stamper for injection molding is manufactured. In this case, the above-described Ni layer formed by the electrolytic plating process has a crystalline structure. Therefore, when the back surface of the formed Ni layer is polished, the Ni layer is cut such that crystal grains, which form the Ni layer, are cut off as units of loss. Accordingly, when the diameter of the crystal grains that form the Ni layer is large, although the polishing process is performed with a view to planarizing the back surface of the formed Ni layer, the back surface of the formed Ni layer comes to have large projections and depressions due to the diameter of the crystal grains. As a consequence, the conventional stamper-manufacturing method suffers from the problem that it is difficult to manufacture a stamper planar enough to manufacture today's information recording medium fine-pitched for high density recording.

In this case, to make smaller the above-mentioned units of loss (diameter of the crystal grains of the Ni layer), it is only required to make a current density small enough during the electrolytic plating process, for example. However, in the electrolytic plating process performed at a reduced current density, it takes a very long time to form an Ni layer having a sufficient thickness. Therefore, when a manufacturing method is employed in which the current density in the electrolytic plating process is reduced to thereby reduce the units of loss during the polishing process, the manufacturing costs of the stamper sharply rises due to the long time taken to form the Ni layer. On the other hand, when the pressing force of a polishing material or the relative moving speed of the polishing material with respect to the Ni layer is reduced so as to avoid the loss of the Ni layer in units of crystal grains which occurs during the polishing process, as described above, there is a possibility that favorable planarization of the back surface of the formed Ni layer can be achieved to some extent, but it takes a very long time to polish the whole back surface of the formed Ni layer. Therefore, when a manufacturing method is employed which manufactures a stamper having a desired planarity by changing polishing conditions of the Ni layer, it takes a long time to polish the Ni layer, which causes a sharp increase in the manufacturing costs of the stamper.

On the other hand, the present applicant has found out that if the electrolytic plating process is carried out using e.g., NiP or NiB as a plating material to form an NiP layer or an NiB layer in place of the above-described Ni layer, the diameter of the crystal grains (units of loss) forming the layer becomes small enough. However, the NiP layer or the NiB layer has a stress larger than that of the Ni layer, so that when the NiP layer or the NiB layer is formed to have the same thickness (approximately 300 μm) as that of the Ni layer, a stamper formed thereof comes to have a large warpage. Therefore, there is a risk that it becomes difficult to set the manufactured stamper in the injection molding machine. Further, it is known that the growth rate of the plating layer per processing time is lower in the electrolytic plating process using NiP or NiB as a plating material than in the electrolytic plating process using Ni as a plating material. Therefore, it takes a very long time to form a plating layer having a thickness of 300 μm by the electrolytic plating process that uses e.g., NiP or NiB as a plating material, which causes a sharp increase in the manufacturing costs of the stamper. Further, it is very difficult to manage a plating solution in the electrolytic plating process using e.g., NiP or NiB as a plating material, and hence it is difficult to manufacture a stamper having a desired thickness.

Further, the present applicant has found out that if an electroless plating process that uses e.g., NiP or NiB as a plating material is carried out in place of the electrolytic plating process, to thereby form an NiP layer or an NiB layer in place of the above-described Ni layer, there exist no crystal grains on the back surface of the stamper, and hence when the NiP layer or the NiB layer is polished, it is possible to prevent the layer from being cut such that crystal grains are cut off as units of loss. However, since it is difficult to form the NiP layer or the NiB layer having the same thickness (approximately 300 μm) as that of the Ni layer by the electroless plating process, this manufacturing method suffers from the problem that it is difficult to form a stamper having a sufficient thickness for withstanding injection molding. Further, it is known that the growth rate of the plating layer per processing time is lower in the electroless plating process than in the electrolytic plating process. Therefore, even if a stamper having a sufficient thickness can be manufactured, it takes a very long time to form the NiP layer or the NiB layer having the same thickness as that of the Ni layer by the electroless plating process, which can cause a sharp increase in the manufacturing costs of the stamper.

In this case, known methods of manufacturing stampers for injection molding include not only the above-described manufacturing method by the plating processes but also a so-called direct mastering method. When a stamper is manufactured by the direct mastering method, first, a mask pattern is formed on a planarized metal plate, by the photolithography method, and a concave/convex pattern is formed on the metal plate by etching using the formed mask pattern as a mask. Therefore, the opposite surfaces of the metal plate are sufficiently planarized before formation of the mask pattern by the photolithography method, so that it is possible to prevent the back surface of a surface formed with the concave/convex pattern from being largely protruded and depressed. In the stamper-manufacturing method by the direct mastering method, however, whenever a stamper is manufactured, it is required to perform the mask pattern-forming process by the above-described photolithography method. This causes the problem that the manufacturing costs of the stamper is sharply increased compared with the stamper-manufacturing method by the above-described plating processes which are capable of manufacturing plural stampers from one glass master disk.

The present invention has been made in view of these problems, and a main object of the present invention is to provide a method of manufacturing a stamper, which makes it possible to easily manufacture a stamper having a back surface thereof sufficiently planarized, in a short time period, a stamper having a back surface thereof sufficiently planarized, and a method of manufacturing a resin molded article, which makes it possible to manufacture a resin molded article to which a concave/convex pattern is excellently transferred.

To achieve the stated object, a method of manufacturing a stamper according to the present invention comprises: forming a stamper body such that the stamper body which is plate-shaped and having a concave/convex pattern formed on one surface thereof has at least a side toward the other surface thereof formed to have a crystalline structure; forming thereafter a layer having an amorphous structure on the other surface side of the stamper body; and polishing thereafter a surface of the layer having the amorphous structure. In addition, a stamper according to the present invention comprises a stamper body which is plate-shaped and is formed such that a concave/convex pattern is formed on one surface thereof and at least a side toward the other surface has a crystalline structure, wherein a layer which has an amorphous structure and a surface of which is polished is formed on the other surface side of the stamper body. It should be noted that throughout the present specification, the term "a layer, most portions of which have an amorphous structure (e.g., a layer configured to have an amorphous portion which is not smaller than 50% of the layer) is referred to as a "layer having an amorphous structure".

According to the method of manufacturing the stamper and the stamper, unlike the stamper manufactured by the conventional method of manufacturing a stamper, which directly polishes and thereby planarizes the back surface of the stamper body (portion of the stamper having a crystalline structure) formed by the electrolytic plating process, the layer having the amorphous structure is polished and is thereby planarized, so that it is possible to prevent the layer from being cut such that crystal grains forming the stamper body are cut off as units of loss, thereby making it possible to obtain a sufficiently favorable surface roughness Ra of the layer after it is polished. Further, according to the method of manufacturing the stamper and the stamper, it is possible to form the stamper body having a sufficient thickness, by the electrolytic plating process in a shorter time period than by the method of manufacturing a stamper, which forms the stamper body by the electroless plating process, for example. Therefore, according to the method of manufacturing the stamper and the stamper, it is possible to prevent the manufacturing costs of the stamper from being sharply increased by an prolonged manufacturing time period. Further, according to the method of manufacturing the stamper and the stamper, unlike the method of manufacturing a stamper, which forms the stamper body by the electroless plating process, a thin layer having the amorphous structure is simply formed, whereby it is possible to make the surface roughness Ra of the thin layer favorable enough. Therefore, irrespective of the magnitude of the stress which the layer having the amorphous structure has, it is possible to prevent the stamper from being largely warped by the presence of the electroless plated layer.

Further, in the method of manufacturing the stamper according to the present invention, a portion of the stamper body having the crystalline structure and the layer having the amorphous structure may be formed of materials having a same main component. In this case, the term "formed of materials having a same main component" is intended to mean "formed such that out of materials that form target portions, not smaller than 80 at. % of the materials are identical to each other".

According to the method of manufacturing the stamper, since the portion of the stamper body having the crystalline structure and the layer having the amorphous structure are connected sufficiently firmly, it is possible to prevent the portion of the stamper body having the crystalline structure and the layer having the amorphous structure from being removed from each other during the injection molding of a resin stamper, for example.

Also, in the method of manufacturing the stamper according to the present invention, the portion of the stamper body having the crystalline structure may be formed of Ni, and the layer having the amorphous structure may be formed of one of NiP and NiB.

According to the method of manufacturing the stamper, since Ni is chemically stable and moreover is excellent in ductility and malleability, the stamper can be repeatedly used without being degraded, damaged or deformed. Further, since materials having Ni as the main component that can be obtained easily and inexpensively are used, it is possible to sufficiently reduce the manufacturing costs of the stamper.

Further, in a method of manufacturing a resin molded article according to the present invention, an injection molding process is carried out using the stamper manufactured by any of the methods described above as a prototype so as to transfer the concave/convex pattern of the stamper to a resin material to manufacture the resin molded article (e.g., a resin stamper for imprinting, and a resin substrate for an optical disc and a magneto-optical disk.

According to the method of manufacturing the resin molded article, since the back surface of the stamper (portion of the stamper body on the side toward the other surface) is sufficiently planarized, it is possible to prevent faulty transfer of the concave/convex pattern from being caused (the shape of the concave/convex pattern of the resin molded article from being degraded) by the projections and depressions on the back surface of the stamper as a prototype.

It should be noted that the disclosure of the present invention relates to a content of Japanese Patent Application 2008-127232 that was filed on 14 May 2008 and the entire content of which is herein incorporated by reference.

BRIEF DESCRIPTION OF THE DRAWINGS

These and other objects and features of the present invention will be explained in more detail below with reference to the attached drawings, wherein:

FIG. 15 is a view useful in explaining the relationship between conditions for manufacturing stampers of Examples 1 to 9 and Comparative Examples 1 to 7 and the surface roughness and the amount of warpage of back surfaces of the stampers;

DESCRIPTION OF THE PREFERRED EMBODIMENTS

Now, the best mode of a method of manufacturing a stamper, a method of manufacturing a resin molded article and a stamper, according to the present invention will be described with reference to the accompanying drawings.

Figure 1:
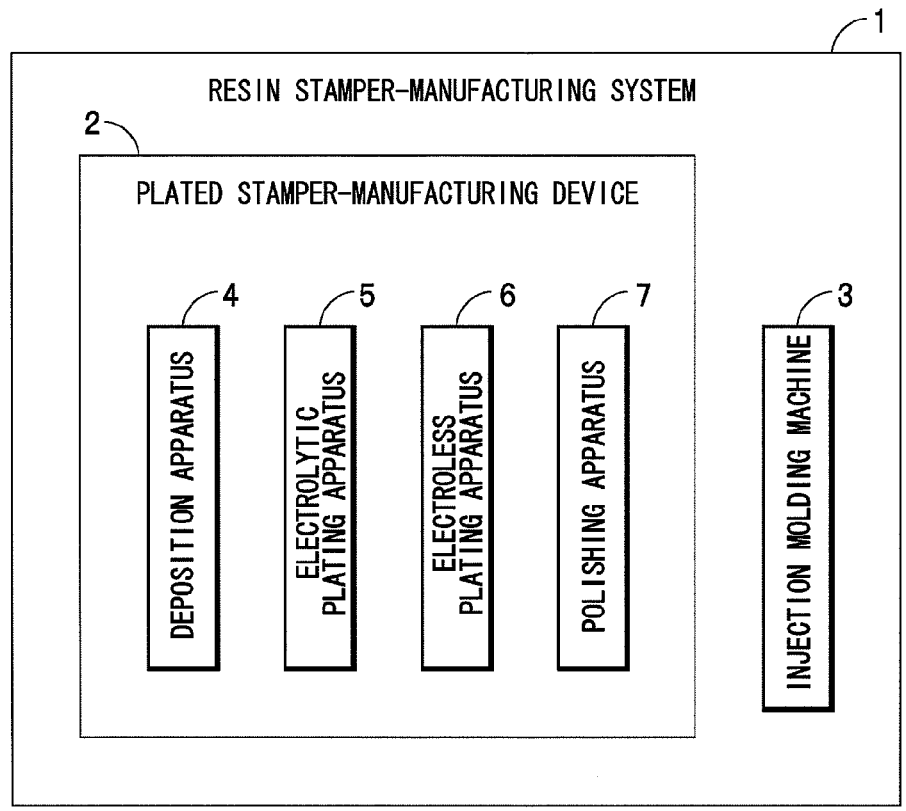
FIG. 1 is a block diagram of a resin stamper manufacturing system.
Figure 14:
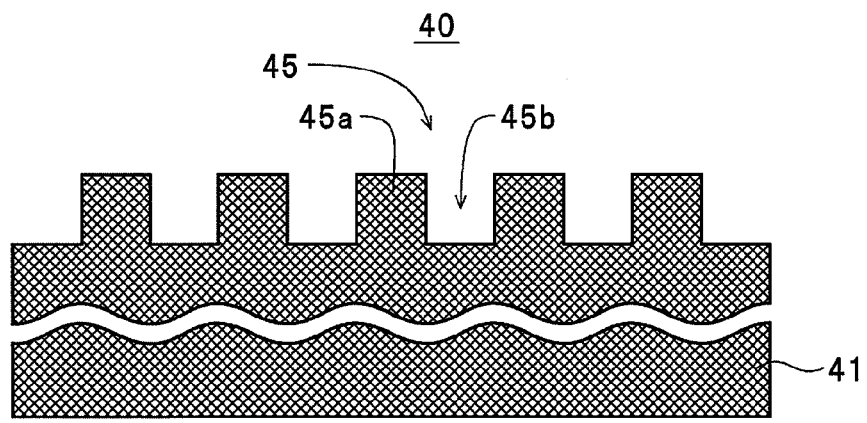
FIG. 14 is a cross-sectional view of the manufactured stamper.

A resin stamper-manufacturing system 1 shown in FIG. 1 is a system for manufacturing a stamper 40 (resin stamper: see FIG. 14) corresponding to a resin molded article of the present invention, according to the method of manufacturing a stamper, according to the present invention, and is comprised of a plated stamper-manufacturing device 2, and an injection molding machine 3. In this case, the injection molding machine 3 executes an injection molding process that uses a resin material, such as polycarbonate, as a molding material, to thereby manufacture the above-mentioned stamper 40 using a stamper 30 (see FIG. 2) made by the plated stamper-manufacturing device 2 as a prototype. Further, the stamper 40 is used for forming etching mask patterns on a preform for manufacturing a magnetic disk by an imprinting method e.g., when manufacturing a discrete track-type magnetic disk (patterned medium: not shown). As shown in FIG. 14, the stamper 40 is formed with a concave/convex pattern 45 including plural convex portions 45a and plural concave portions 45b, and is generally in the form of a disk. It should be noted that the method of forming the mask pattern by an imprinting process using the stamper 40, and the method of manufacturing an information recording medium by etching using the mask pattern are known, and hence detailed description thereof is omitted.

Figure 4:
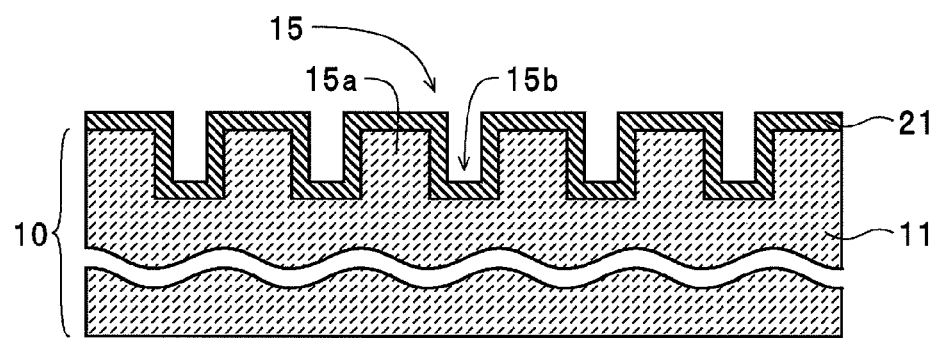
FIG. 4 is a cross-sectional view of the master disk in a state in which an electrode layer is formed in a manner covering the concave/convex pattern.
Figure 5:
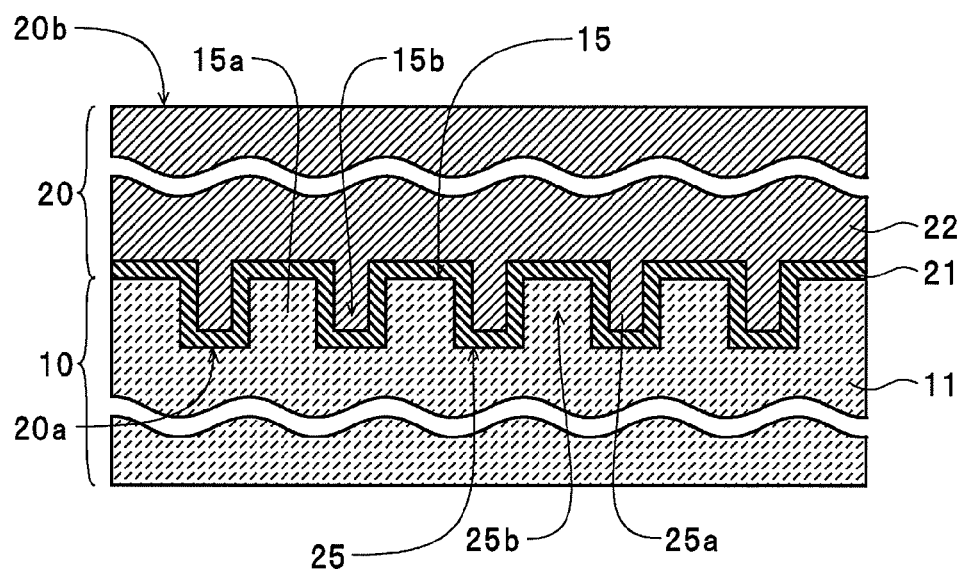
FIG. 5 is a cross-sectional view of the master disk in a state in which an electrolytic plated layer is formed by an electrolytic plating process (in a state in which the stamper is formed)
Figure 6:
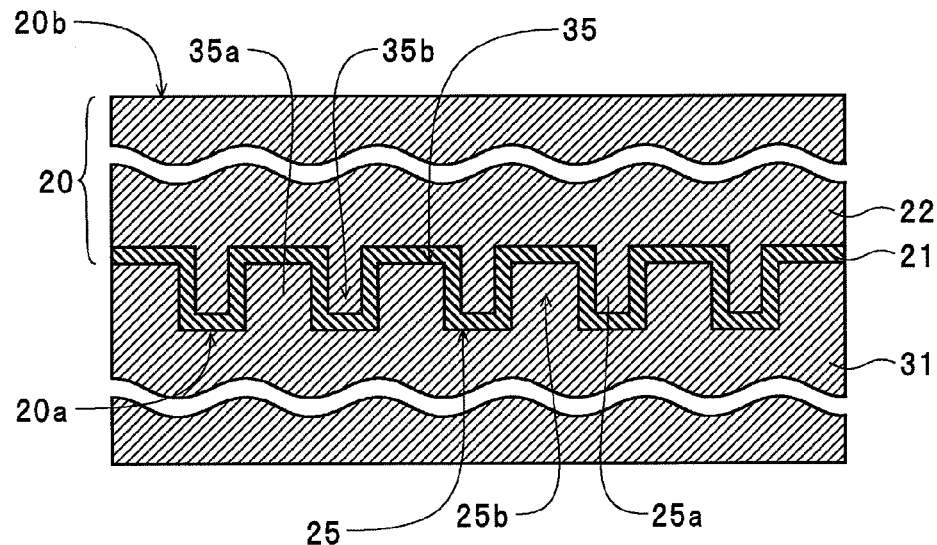
FIG. 6 is a cross-sectional view of the stamper in a state in which the electrolytic plated layer is formed by the electrolytic plating process.
Figure 9:
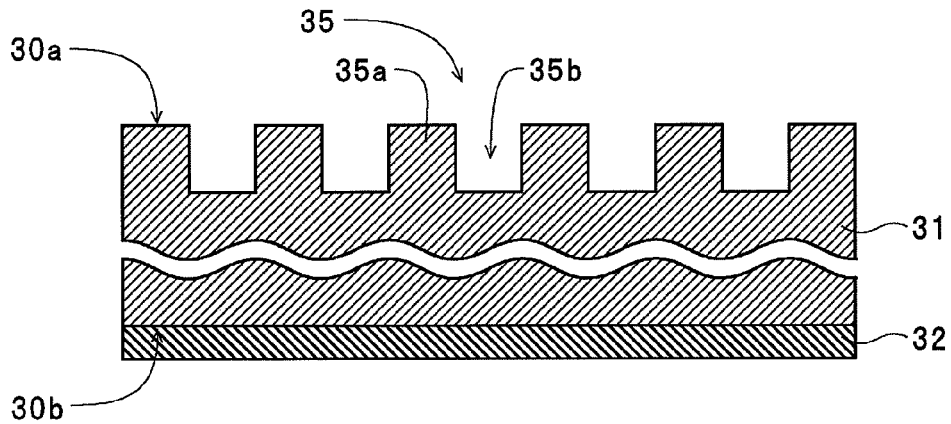
FIG. 9 is a cross-sectional view of the electrolytic plated layer in a state in which an electroless plated layer is formed on the second surface.

On the other hand, the plated stamper-manufacturing device 2 is for manufacturing the stamper 30 corresponding to a stamper of the present invention, according to the method of manufacturing a stamper, according to the present invention, and is comprised of a deposition apparatus 4, an electrolytic plating apparatus 5, an electroless plating apparatus 6, and a polishing apparatus 7. When a stamper 20 for manufacturing the stamper 30 is manufactured, the deposition apparatus 4 forms an electrode layer 21 on a surface of a silicon substrate 11 (master disk 10) by a deposition process, as shown in FIG. 4. During manufacturing the above-mentioned stamper 20, the electrolytic plating apparatus 5 executes an electrolytic plating process using the electrode layer 21 formed by the deposition apparatus 4, as an electrode layer, to thereby form an electrolytic plated layer 22 on the electrode layer 21, as shown in FIG. 5. Further, when the stamper 30 is manufactured, the electrolytic plating apparatus 5 executes the electrolytic plating process using the stamper 20 as an electrode, to thereby form an electrolytic plated layer 31 on a first surface 20a (surface of the electrode layer 21) of the stamper 20, as shown in FIG. 6. During manufacturing the above-mentioned stamper 30, the electroless plating apparatus 6 executes an electroless plating process, to thereby form an electroless plated layer 32 on a second surface 30b ("the other surface" in the present invention) of the electrolytic plated layer 31, as shown in FIG. 9. The polishing apparatus 7 includes a turntable (not shown) that turns an object to be polished while holding the object to be polished, a polishing tape 7a (see FIG. 11), and a pressing roller 7b (see FIG. 11) that presses the polishing tape 7a against the object to be polished, for polishing and planarizing a surface of the electroless plated layer 32 formed by the electroless plating apparatus 6.

Figure 2:
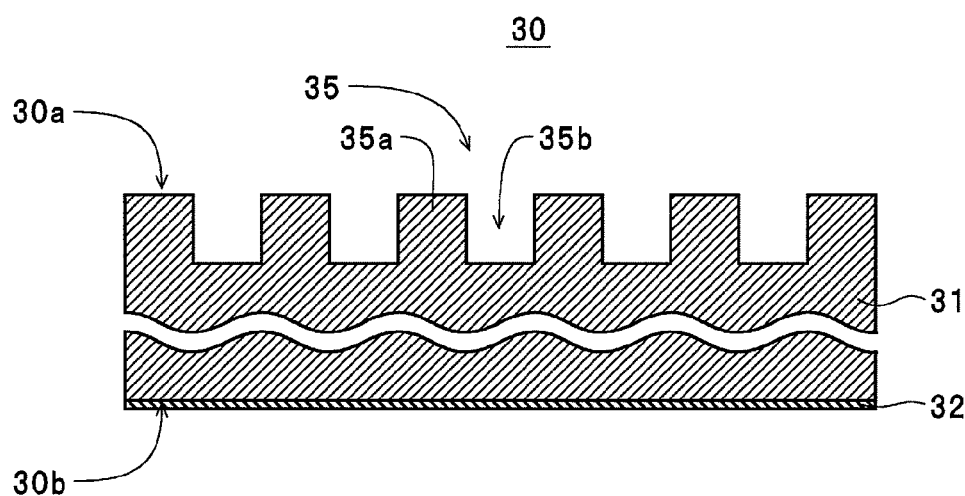
FIG. 2 is a cross-sectional view of a stamper.

In this case, as described above, the stamper 30 is a plated stamper (metal stamper) that is used as a prototype when injection-molding the stamper 40, and is formed by transferring a concave/convex pattern 25 of the stamper 20 shown in FIG. 6 to a stamper-forming material (plating material) by an electrolytic plating process. Referring to FIG. 2, the stamper 30 includes the electrolytic plated layer 31 in the form of a plate, which is formed with a concave/convex pattern 35 formed by transferring the above-mentioned concave/convex pattern 25 to a first surface 30a ("one surface in the present invention) of the stamper 30. The second surface 30b ("the other surface in the present invention) of the electrolytic plated layer 31 is formed with the electroless plated layer 32 a surface of which is planarized by a polishing process.

Further, the electrolytic plated layer 31 forms a stamper body in the present invention, and as described hereinafter, is formed by the electrolytic plating process which uses Ni as a plating material, such that the whole of the electrolytic plated layer 31 ranging from the first surface 30a (e.g., protruding end surfaces of convex portions 35a of the above-described concave/convex pattern 35) to the second surface 30*b*, has a crystalline structure. Furthermore, the electroless plated layer 32 forms a "layer having an amorphous structure" in the present invention, and as described hereinafter, is formed by the electroless plating process which uses e.g., NiP (the atomic percent of "P" is e.g., from 5% to 20%, inclusive). It should be noted the present applicant has confirmed that the stamper 30 which has the electrolytic plated layer 31 formed by the plating process, as described above, is advantageous in that oxidation is more difficult to occur therein than in a stamper (not shown) a body of which is formed by a direct mastering method e.g., using a thin plate of Ni.

Figure 3:
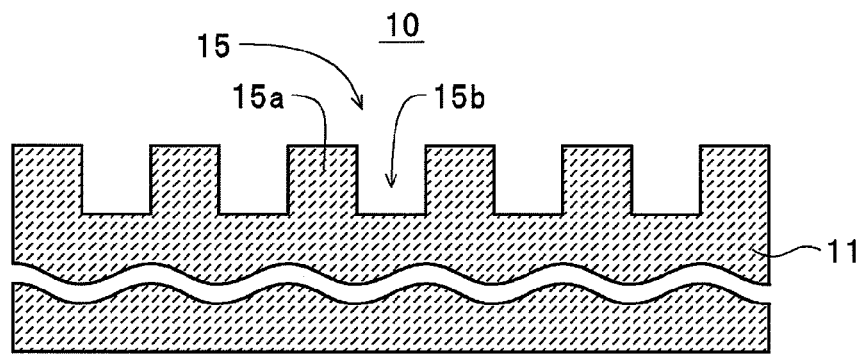
FIG. 3 is a cross-sectional view of a master disk formed with a concave/convex pattern for manufacturing a stamper.

In manufacturing the stamper 30, first, the stamper 20 is manufactured as a master stamper. More specifically, as shown in FIG. 3, first, the master disk 10 having a concave/convex pattern 15 formed on a surface of the silicon substrate 11 thereof is prepared. In the master disk 10, the above-described concave/convex pattern 15 is formed on the silicon substrate 11 e.g., by etching using a mask pattern (not shown) formed by the photolithography method (electron beam lithography method) as a mask. In this case, the concave/convex pattern 15 formed on the silicon substrate 11 is formed with convex portions 15*a* corresponding to convex portions 35*a* of the concave/convex pattern 35 of the stamper 30, and concave portions 15*b* corresponding to concave portions 35*b* of the concave/convex pattern 35 of the stamper 30. It should be noted that the method of forming the mask pattern by the photolithography method, and the method of manufacturing the master disk 10 by etching using the mask pattern are known, and hence detailed description thereof is omitted and they are not shown in the drawings.

Next, the master disk 10 is set in the deposition apparatus 4, and as shown in FIG. 4, Ni is deposited on a surface of the concave/convex pattern 15 of the master disk 10 by a deposition process, to thereby form the electrode layer (conductive layer) 21 having a thickness of approximately 10 to 70 nm. In this case, the electrode layer 21 can also be manufactured by various kinds of methods, such as the electroless plating process and a sputtering process, in place of the method of forming the electrode layer 21 by the deposition process. Then, the master disk 10 having the electrode layer 21 formed thereon is set in the electrolytic plating apparatus 5, and as shown in FIG. 5, the electrolytic plated layer 22 having a thickness of approximately 300 µm is formed on the electrode layer 21 by executing the electrolytic plating process (electroforming process) using Ni as a plating material and the electrode layer 21 as an electrode. Through this process, as shown in FIG. 5, the concave/convex pattern 15 formed on the master disk 10 is transferred to a metal material (Ni, in the illustrated example), whereby the concave/convex pattern 25 is formed which has plural convex portions 25*a* corresponding to the concave portions 15*b* of the concave/convex pattern 15, and plural concave portions 25*b* corresponding to the convex portions 15*a* of the concave/convex pattern 15. Then, the laminate of the electrode layer 21 and the electrolytic plated layer 22 is removed from the master disk 10, whereby the stamper 20 as a master stamper is completed.

It should be noted that a resin stamper (resin molded article) for use in the imprinting process can be manufactured by an injection molding process which uses the stamper 20 as a prototype. In this case, a layer having an amorphous structure in the present invention is formed on a second surface 20*b* ("the other surface" in the present invention) of the stamper 20, as described hereinafter, and is then polished for planarizing the back surface of the stamper 20. On the other hand, there is a risk that use of the expensive stamper 20 causes a sharp increase in the manufacturing costs of resin stampers.

Therefore, in the illustrated example, the concave/convex pattern 25 of the stamper 20 is transferred to another stamper-forming member according to a procedure, described hereinafter, whereby plural prototypes (stamper 30) are manufactured from one stamper 20. More specifically, first, the stamper 20 is set in the electrolytic plating apparatus 5, and the electrolytic plating process is executed using Ni as a plating material and the stamper 20 as an electrode, to thereby form the electrolytic plated layer 31 having a thickness of approximately 290 µm as shown in FIG. 6. In doing this, by setting a current density to approximately 10.0 A/dm$^2$, the electrolytic plated layer 31 having a sufficient thickness is formed in a processing time as short as approximately three hours. This transfers the concave/convex pattern 25 of the stamper 20 to a metal material (Ni, in the illustrated example), whereby the concave/convex pattern 35 is formed which has the plural convex portions 35*a* corresponding to the concave portions 25*b* of the concave/convex pattern 25, and the plural concave portions 35*b* corresponding to the convex portions 25*a* of the concave/convex pattern 25. In this case, the electrolytic plated layer 31 (stamper body in the present invention) has a crystalline structure since it is formed by the electrolytic plating process using Ni as the plating material, as described hereinabove.

Figure 7:
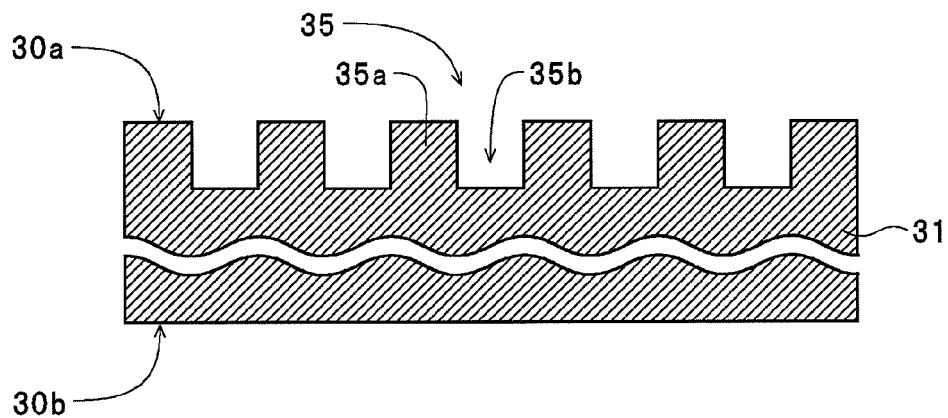
FIG. 7 is a cross-sectional view of the electrolytic plated layer that is removed from the stamper after completion of the electrolytic plating process.
Figure 8:
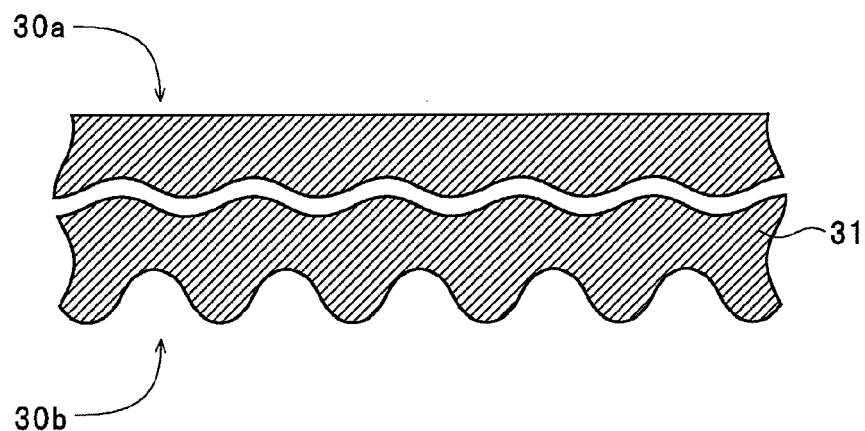
FIG. 8 is a fragmentary expanded cross-sectional view of a second surface of the electrolytic plated layer.

Next, as shown in FIG. 7, the electrolytic plated layer 31 is removed from the stamper 20. In this case, as shown in FIG. 8, the second surface 30*b* of the electrolytic plated layer 31 has large projections and depressions such that the height difference (distance between protruding ends of the projections and bottoms of the depressions of the second surface 30*b*, along the direction of thickness thereof) becomes equal to approximately 1 µm. It should be noted that in FIG. 8 and FIGS. 10 and 12, referred to hereinafter, the protruding end surface of each convex portion 35*a* of the above-described concave/convex pattern 35 is shown as the first surface 30*a*, by way of example. Then, the electrolytic plated layer 31 is set in the electroless plating apparatus 6, and as shown in FIG. 9, the electroless plated layer 32 having a thickness of approximately 10 µm is formed on the second surface 30*b* of the electrolytic plated layer 31 by the electroless plating process using NiP as a plating material. In this case, in general, compared with a layer which is formed of a single material (including materials into which is mixed a very small amount of oxygen, an impurity or the like) such that the layer has a crystalline structure (e.g., the electrolytic plated layer 31 formed by the electrolytic plating process using Ni as a plating material), a layer which is formed of two or more materials (i.e., material formed by intentionally mixing two or more materials: excluding a single kind of material into which is mixed a very small amount of oxygen, an impurity or the like) such that the layer has the amorphous structure (e.g., a layer (e.g., the electroless plated layer 32 formed by the electroless plating process) formed of a plating material prepared by adding an additive material (P, B, or the like) to a main component (e.g., Ni)) has a larger stress.

Figure 10:
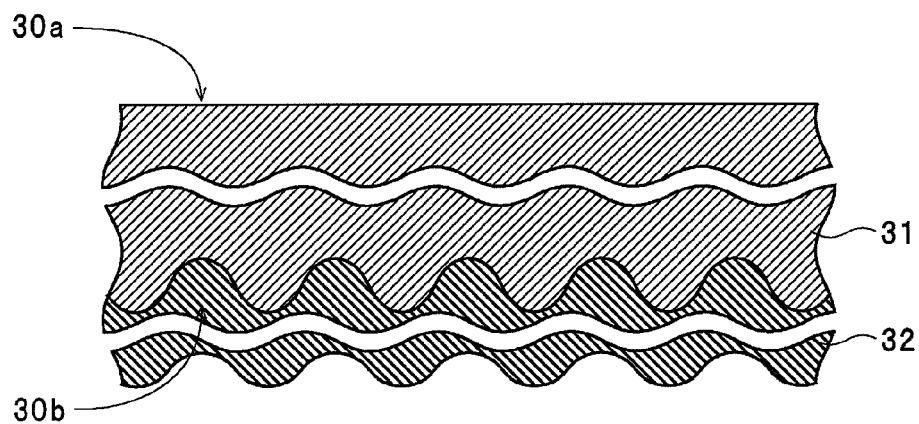
FIG. 10 is a fragmentary expanded cross-sectional view of the electrolytic plated layer formed with the electroless plated layer.

Therefore, there is a risk that in a state in which the layer formed e.g., of NiP or NiB and having the amorphous structure has a thickness excessively larger than the thickness of the layer formed e.g., of Ni and having the crystalline structure, a laminate thereof is warped due to the difference between the stresses of the layers. In the present method of manufacturing a stamper, however, the electroless plated layer 32 has a very small thickness of 10 µm, and therefore irrespective of the magnitude of the stress of the formed electroless plated layer 32, it is possible to prevent the electrolytic plated layer 31 from being largely warped by the presence of the electroless plated layer 32. It should be noted that as shown in FIG. 10, a surface (lower surface, as viewed in FIG. 10) of the electroless plated layer 32 has large projections and depressions following the projections and depressions of the second surface 30b of the electrolytic plated layer 31.

Figure 11:
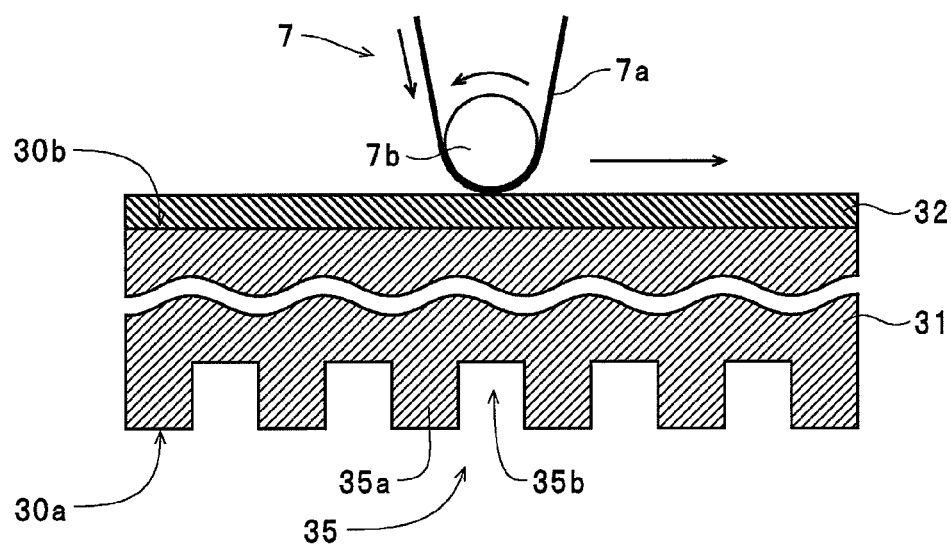
FIG. 11 is a cross-sectional view of the electrolytic plated layer and the electroless plated layer in a state in which a surface of the electroless plated layer is being polished.
Figure 12:
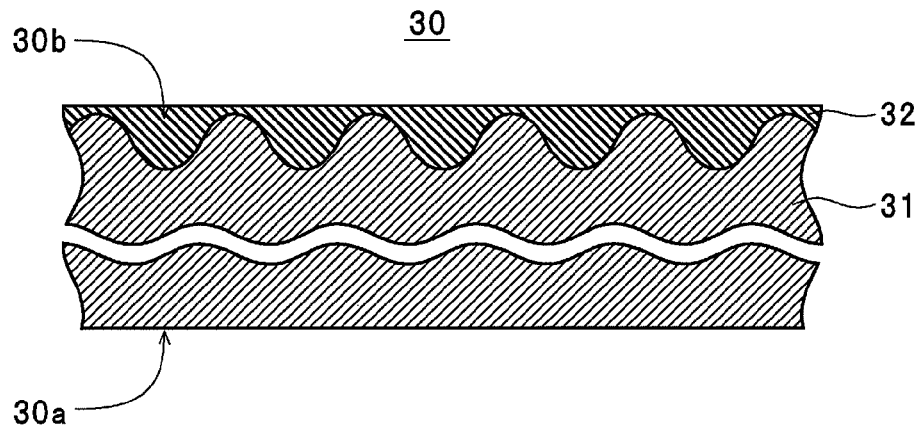
FIG. 12 is a fragmentary expanded cross-sectional view of the stamper in a state in which the polishing process has been completed.

Next, the laminate of the electrolytic plated layer 31 and the electroless plated layer 32 is set in the polishing apparatus 7, and as shown in FIG. 11, the surface of the electroless plated layer 32 is polished. In doing this, the polishing process is executed e.g., for approximately 20 minutes by using the polishing tape 7a having roughness of approximately #4000, whereby the electroless plated layer 32 is polished to such an extent so as not to cause the second surface 30b of the electrolytic plated layer 31 to be exposed from the electroless plated layer 32 (to such an extent so as not to cause the protruding ends of any of the projections of the projections and depressions of the second surface 30b to be exposed). In this case, the electroless plated layer 32 has the amorphous structure since it is formed by using NiP as the plating material. Therefore, unlike the conventional method of manufacturing a stamper, which polishes a layer formed by the electrolytic plating process (layer having a crystalline structure), the electroless plated layer 32 is cut in very small units of loss without being cut such that crystal grains are cut off as units of loss. Thus, as shown in FIG. 12, the second surface 30b of the electrolytic plated layer 31 is sufficiently planarized in a state in which the material (NiP, in the illustrated example) forming the electroless plated layer 32, which has the amorphous structure, fills the depressions of the projections and depressions of the second surface 30b, such that the surface roughness Ra of the second surface 30b is reduced to approximately 2 nm. From the above, as shown in FIG. 2, the stamper 30 as a mother stamper is completed.

Figure 13:
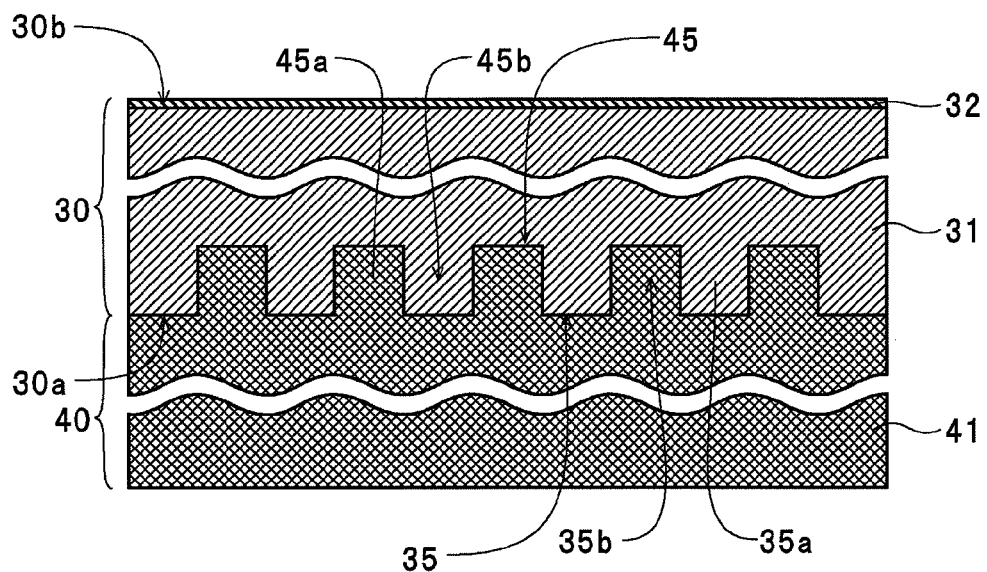
FIG. 13 is a cross-sectional view of a stamper in a state being manufactured by an injection molding process using the FIG. 12 stamper.

On the other hand, when the stamper 40 for the imprinting process is manufactured using the stamper 30, the stamper 30 is set in the injection molding machine 3. In doing this, since no large warpage occurs on the stamper 30 as described above, the stamper 30 is reliably brought into intimate contact with a stamper holder (not shown) of the injection molding machine 3. Then, the injection molding process is carried out using e.g., polycarbonate as a molding material (resin material 41). Through this process, as shown in FIG. 13, the concave/convex pattern 35 of the stamper 30 is transferred to the resin material 41, whereby the concave/convex pattern 45 is formed which includes the plural convex portions 45a corresponding to the concave portions 35b of the concave/convex pattern 35, and the plural concave portions 45b corresponding to the convex portion 35a of the concave/convex pattern 35. In this case, as described hereinabove, a surface of the stamper 30 on the side toward the second surface 30b of the electrolytic plated layer 31 (the surface of the electroless plated layer 32) is sufficiently planarized. Hence it is possible to prevent the shape of the concave/convex pattern 45 from being degraded by the presence of the projections and depressions on the back surface of the stamper 30 when the resin material 41 is injected to cause the stamper 30 to be pressed against the stamper holder (large pressure is applied to the stamper 30). Then, the resin material 41 is removed from the stamper 30, whereby as shown in FIG. 14, the stamper 40 is completed as a child stamper formed with the concave/convex pattern 45. In this case, since plural stampers 40 are manufactured from one stamper 30, it is possible to sufficiently reduce the manufacturing costs of information recording media (magnetic disks) manufactured using the stampers 40.

As described above, in the method of manufacturing the stamper 30, the electrolytic plated layer 31 is formed on the first surface 30a such that the electrolytic plated layer 31 (stamper body), which is in the form of a plate and is formed with the concave/convex pattern 35, has a crystalline structure at least on the side toward the second surface 30b (the whole of the electrolytic plated layer 31 in the illustrated example), and then the electroless plated layer 32 (layer having an amorphous structure) is formed on the second surface 30b of the electrolytic plated layer 31, whereafter the surface of the electroless plated layer 32 is polished for planarization to thereby manufacture the stamper 30. Further, the stamper 30 manufactured by this method comprises the electrolytic plated layer 31 which is in the form of a plate and is formed such that the first surface 30a is formed with the concave/convex pattern 35 and at least on the side toward the second surface 30b (the whole of the electrolytic plated layer 31 in the illustrated example) has a crystalline structure. Further, the second surface 30b of the electrolytic plated layer 31 is formed with the electroless plated layer 32 the surface of which is polished to be planarized.

Therefore, according to the method of manufacturing the stamper 30 and the stamper 30 according to the present invention, unlike the stamper manufactured by the conventional method of manufacturing a stamper, which directly polishes and thereby planarizes the back surface of the stamper body (portion of the stamper having a crystalline structure) formed by the electrolytic plating process, the electroless plated layer 32 having the amorphous structure is polished and is thereby planarized, so that it is possible to prevent the electroless plated layer 32 from being cut such that crystal grains forming the stamper body (the electrolytic plated layer 31) are cut off as units of loss, thereby making it possible to obtain a sufficiently favorable surface roughness Ra of the electroless plated layer 32 after it is polished. Further, according to the method of manufacturing the stamper 30 and the stamper 30, it is possible to form the stamper body (the electrolytic plated layer 31) having a sufficient thickness, by the electrolytic plating process in a shorter time period than by the method of manufacturing a stamper, which forms the stamper body by the electroless plating process, for example. Therefore, according to the method of manufacturing the stamper 30 and the stamper 30, it is possible to prevent the manufacturing costs of the stamper 30 from being sharply increased by an prolonged manufacturing time period. Further, according to the method of manufacturing the stamper 30 and the stamper 30, unlike the method of manufacturing a stamper, which forms the stamper body by the electroless plating process, a thin layer having the amorphous structure (the electroless plated layer 32) is simply formed, whereby it is possible to make the surface roughness Ra of the thin layer favorable enough. Therefore, irrespective of the magnitude of the stress which the electroless plated layer 32 has, it is possible to prevent the stamper 30 from being largely warped by the presence of the electroless plated layer 32.

Further, according to the method of manufacturing the stamper 30, since the electrolytic plated layer 31 and the electroless plated layer 32 are formed of materials having the same main component (Ni, in the illustrated example), whereby the electrolytic plated layer 31 and the electroless plated layer 32 are connected sufficiently firmly, which makes it possible to prevent the electrolytic plated layer 31 and the electroless plated layer 32 from being removed from each other during the injection molding of the stamper 40, for example.

Furthermore, according to the method of manufacturing the stamper 30, the electrolytic plated layer 31 is formed of Ni and the electroless plated layer 32 is formed of NiP. Since Ni is chemically stable and moreover is excellent in ductility and malleability, the stamper 30 can be repeatedly used without being degraded, damaged or deformed. Further, since materials having Ni as the main component that can be obtained easily and inexpensively are used, it is possible to sufficiently reduce the manufacturing costs of the stamper 30.

Further, according to the method of manufacturing the stamper 40, the stamper 40 is manufactured by executing the injection molding process using the stamper 30 as a prototype and thereby transferring the concave/convex pattern 35 of the stamper 30 to the resin material 41. Therefore, since the back surface of the stamper 30 (portion of the electrolytic plated layer 31 on the side toward the second surface 30b) is sufficiently planarized, it is possible to prevent faulty transfer of the concave/convex pattern 35 from being caused (the shape of the concave/convex pattern 45 of the stamper 40 from being degraded) by the projections and depressions on the back surface of the stamper 30 as a prototype.

EXAMPLES

Next, the method of manufacturing the stampers and the stampers according to the present invention will be described in more details based on Examples.

Referring to FIG. 15, stampers of Examples 1 to 9 were manufactured by the method of manufacturing a stamper according to the present invention, while stampers of Comparative Examples 1 to 7 were manufactured by the conventional method of manufacturing a stamper. Further, the surface roughness Ra of the back surface of each manufactured stamper and the amount of warpage of the stamper were measured, respectively. The results of the measurements are shown in FIG. 15. It should be noted that conditions for manufacturing the stampers of Examples 1 to 9 and Comparative Examples 1 to 7 were as follows:

Example 1

The stamper was manufactured by the same procedure as employed in manufacturing the above-described stamper 30. In this case, to form a stamper body (portion corresponding to the electrolytic plated layer 31 of the stamper 30) according to the present invention (during the electrolytic plating process), an electrolytic plated layer having a thickness of 300 μm was formed using an electroforming apparatus available from NOVEL Technology Co. Ltd. and nickel sulfamate (specific gravity=1.3) available from Showa Chemical Co., Ltd. as a plating material under the conditions of a plating temperature of 55° C., pH of 4.0, a current density of 10.0 A/dm², and a processing time of 3.0 hours. Further, to form a layer having the amorphous structure (portion corresponding to the electroless plated layer 32 of the stamper 30) according to the present invention (during the electroless plating process), an electroless plated layer having a thickness of 1 μm was formed using HP-55 available from NIHON KAGAKU SANGYO Co., Ltd. as a plating solution under the conditions of a plating temperature of 85° C. and a processing time of 3 minutes. Furthermore, to polish the electroless plated layer (during the polishing process), the polishing process was executed for 20 minutes using a tape-polishing apparatus available from Sanshin Co., Ltd. and a polishing tape with a roughness of approximately #4000.

Example 2

The same processes as carried out during manufacturing the stamper of Example 1 were executed except that to form a layer having an amorphous structure in the present invention (during the electroless plating process), an electroless plated layer having a thickness of 2 μm was formed under the condition of a processing time of 5 minutes.

Example 3

The same processes as carried out during manufacturing the stamper of Example 1 were executed except that to form a layer having an amorphous structure in the present invention (during the electroless plating process), an electroless plated layer having a thickness of 5 μm was formed under the condition of a processing time of 15 minutes.

Example 4

The same processes as carried out during manufacturing the stamper of Example 1 were executed except that to form a stamper body according to the present invention (during the electrolytic plating process), an electrolytic plated layer having a thickness of 290 μm was formed under the condition of a processing time of 2.9 hours, and to form a layer having an amorphous structure in the present invention (during the electroless plating process), an electroless plated layer having a thickness of 10 μm was formed under the conditions of a processing time of 20 minutes.

Example 5

The same processes as carried out during manufacturing the stamper of Example 1 were executed except that to form a stamper body according to the present invention (during the electrolytic plating process), an electrolytic plated layer having a thickness of 280 μm was formed under the condition of a processing time of 2.8 hours, and to form a layer having an amorphous structure in the present invention (during the electroless plating process), an electroless plated layer having a thickness of 20 μm was formed under the conditions of a processing time of 60 minutes.

Example 6

The same processes as carried out during manufacturing the stamper of Example 1 were executed except that to form a stamper body according to the present invention (during the electrolytic plating process), an electrolytic plated layer having a thickness of 280 μm was formed under the condition of a processing time of 2.8 hours, and to form a layer having an amorphous structure in the present invention (during the electroless plating process), an electroless plated layer having a thickness of 25 μm was formed under the conditions of a processing time of 120 minutes.

Example 7

The same processes as carried out during manufacturing the stamper of Example 1 were executed except that to form a stamper body according to the present invention (during the electrolytic plating process), an electrolytic plated layer having a thickness of 270 μm was formed under the condition of a processing time of 2.7 hours, and to form a layer having an amorphous structure in the present invention (during the electroless plating process), an electroless plated layer having a thickness of 30 μm was formed under the conditions of a processing time of 180 minutes.

Example 8

The same processes as carried out during manufacturing the stamper of Example 1 were executed except that to form a stamper body according to the present invention (during the electrolytic plating process), an electrolytic plated layer having a thickness of 270 μm was formed under the condition of a processing time of 2.7 hours, and to form a layer having an amorphous structure in the present invention (during the electroless plating process), an electroless plated layer having a thickness of 35 μm was formed under the conditions of a processing time of 300 minutes.

Example 9

The same processes as carried out during manufacturing the stamper of Example 1 were executed except that to form a stamper body according to the present invention (during the electrolytic plating process), an electrolytic plated layer having a thickness of 260 μm was formed under the condition of a processing time of 2.6 hours, and to form a layer having an amorphous structure in the present invention (during the electroless plating process), an electroless plated layer having a thickness of 40 μm was formed under the conditions of a processing time of 450 minutes.

Comparative Example 1

The same processes as carried out during manufacturing the stamper of Example 1 were executed except that the formation of a portion corresponding to the layer having the amorphous structure in the present invention (the electroless plating process) was not performed, and the back surface of the stamper body was directly polished during the polishing process.

Comparative Example 2

The same processes as carried out during manufacturing the stamper of Comparative Example 1 were executed except that a processing time during the polishing process was set to 40 minutes.

Comparative Example 3

The same processes as carried out during manufacturing the stamper of Comparative Example 1 were executed except that a processing time during the polishing process was set to 60 minutes.

Comparative Example 4

The same processes as carried out during manufacturing the stamper of Comparative Example 1 were executed except that a processing time during the polishing process was set to 80 minutes.

Comparative Example 5

To form a portion corresponding to the stamper body according to the present invention (during the electrolytic plating process), an electrolytic plated layer having a thickness of 300 μm was formed under the condition of a current density of 5.0 A/dm$^2$, and a processing time of 6.0 hours. Further, during the polishing process, the back surface of the stamper body was directly polished. As to the other processes, the same processes as carried out during manufacturing the stamper of Example 1 were executed except that the formation of a portion corresponding to the layer having the amorphous structure in the present invention (the electroless plating process) was not performed.

Comparative Example 6

To form a portion corresponding to the stamper body according to the present invention (during the electrolytic plating process), an electrolytic plated layer having a thickness of 300 μm was formed under the condition of a current density of 2.0 A/dm$^2$, and a processing time of 15.0 hours. As to the other processes, the same processes as carried out during manufacturing the stamper of Example 1 were executed except that the formation of a portion corresponding to the layer having the amorphous structure in the present invention (the electroless plating process) was not performed, and the back surface of the stamper body was directly polished during the polishing process.

Comparative Example 7

To form a portion corresponding to the stamper body according to the present invention (during the electrolytic plating process), an electrolytic plated layer having a thickness of 300 μm was formed under the condition of a current density of 1.0 A/dm$^2$, and a processing time of 30.0 hours. As to the other processes, the same processes as carried out during manufacturing the stamper of Example 1 were executed except that the formation of a portion corresponding to the layer having the amorphous structure in the present invention (the electroless plating process) was not performed, and the back surface of the stamper body was directly polished during the polishing process.

[Measurement of Surface Roughness Ra] A range of a measurement area=2×2 mm was measured using an interference light microscope available from Zygo Corporation.

[Measurement of the amount of warpage] As to each of the manufactured stampers, after placing it on a polishing table with a surface thereof formed with the concave/convex pattern facing upward (with the polished surface thereof facing downward), the distance between a portion of the stamper farthest from the surface of the polishing table and the surface of the polishing table was measured.

As shown in FIG. 15, in the stampers of Examples 1 to 9, each of which was manufactured by forming the layer having the amorphous structure (electroless plated layer) on the back surface of the stamper body (electrolytic plated layer) having one surface thereof formed with the concave/convex pattern, and then polishing the layer, the surface roughness Ra of the polished surface (surface opposite to the surface formed with the concave/convex pattern) of each stamper is not larger than 11.0 nm, which is very favorable. In contrast, in the stampers of Comparative Examples 1 to 4, each of which was manufactured by forming the stamper body (electrolytic plated layer) by the same process as carried out for manufacturing the stampers of Examples 1 to 9 without forming the layer having the amorphous structure (electroless plated layer), and then directly polishing the back surface of the stamper body, the surface roughness Ra of the polished surface (surface on opposite to the surface formed with the concave/convex pattern) of each stamper is not smaller than 17.0 nm, which is much more degraded.

In this case, compared with the stamper of Comparative Example 1, which was subjected to the polishing process for the same time period as in manufacturing the stampers of Examples 1 to 9, the stampers of Comparative Examples 2 to 4, which were subjected to the polishing process for 40 minutes, 60 minutes, and 80 minutes, respectively, are slightly improved in the surface roughness Ra with respect to the surface roughness Ra=20 nm of the stamper of Comparative Example 1. However, although the stampers of Comparative Examples 2 to 4 were subjected to the polishing process for time periods that are twice, three times, and four times as long as the time period required for polishing the stamper of Comparative Example 1, respectively, not only the effects of polishing the stampers are small but also the surface roughnesses Ra thereof are too degraded to be compared with the stampers of Examples 1 to 9. It can be understood therefore that it is difficult for the method of manufacturing a stamper, in which a layer having amorphous structure for the present invention is not formed, to improve the surface roughnesses Ra of the stampers, even if conditions for performing the polishing process (processing time, in the illustrated example) are changed.

Further, in the stampers of Comparative Examples 5 to 7, which are processed at reduced current densities so as to make smaller the diameter of crystal grains formed during forming the stamper bodies (during the electrolytic plating process), although the back surfaces of the stamper bodies are directly polished similarly to the stampers of Comparative Examples 1 to 4, the surface roughnesses Ra thereof are not larger than 10.1 nm, which is very favorable. In this case, in the stampers of Comparative Examples 6 and 7 processed at the current densities of 2.0 A/dm$^2$ and 1.0 A/dm$^2$, respectively, the surface roughnesses Ra are improved compared with the stamper of Comparative Example 5 processed at the current density of 5.0 A/dm$^2$. However, in the stampers of Comparative Examples 5 to 7, which are processed at reduced current densities, it takes a very long time to form the electrolytic plated layers (stamper bodies) having sufficient thicknesses (300 µm, in the illustrated example). This causes the problem that to manufacture the stampers of Comparative Examples 5 to 7, the manufacturing costs thereof increase in proportion to the lengths of the processing time periods.

On the other hand, out of the stampers of Examples 1 to 9, each of which was manufactured by forming and polishing the electroless plated layer corresponding to the layer with the amorphous structure in the present invention, the stampers of Examples 2 to 9 including the electroless plated layers thicknesses of which are not smaller than 2 µm have surface roughnesses Ra of not larger than 5.7 nm, which is much more favorable than that of the stamper of Example 1 which has the electroless plated layer having a thickness of 1 µm. In this case, it can be said that for a stamper for use in manufacturing patterned media (e.g., discrete track media) which are more and more finely pitched on the order of nm, it is ideal that the surface roughness Ra is not larger than 5.7 nm, for the purpose of manufacturing excellent patterned media. Therefore, to manufacture such a stamper, it is preferable to set the thickness of a layer having an amorphous structure (electroless plated layer) to not smaller than 2 µm.

In this case, it can be understood that there is no significant difference between the surface roughnesses of the stampers of Examples 8 and 9 in which the thicknesses of the layers having the amorphous structures (electroless plated layers) are not smaller than 35 µm, and the surface roughnesses of the stampers of Examples 1 to 7 in which the thicknesses of the layers having the amorphous structures (electroless plated layers) are not larger than 30 µm. Further, in the stampers of Examples 8 and 9, it takes 300 minutes or more to form the layers having the amorphous structures (electroless plated layers), and the amounts of warpage of the completed stampers are not smaller than 260 µm. In this case, among injection molding machines that use the above stampers, there is one of a type which cannot appropriately hold a stamper the amount of warpage of which is not smaller than 200 µm. Therefore, to manufacture a layer having an amorphous structure (electroless plated layer) the amount of warpage of which is not larger than 200 µm and the surface roughness Ra of which is favorable enough, in a short time period, it is preferable to set the thickness of the layer having the amorphous structure (electroless plated layer) to not larger than 30 µm.

It should be noted that the present invention is by no means limited to the constructions and methods described heretofore. For example, although in the above-described example, the electrolytic plated layer 31 corresponding to the stamper body in the present invention is formed of Ni, and the electroless plated layer 32 corresponding to the layer having the amorphous structure in the present invention is formed of NiP, the materials for forming the stamper body and the layer having the amorphous structure in the present invention are not limited to Ni and NiP. More specifically, it is possible to employ NiB (the atomic percent of "B" is e.g., 5% to 20%, inclusive), NiCo (the atomic percent of "Co" is e.g., 5% to 20%, inclusive), CoAg (the atomic percent of "Ag" is e.g., 5% to 20%, inclusive), and so forth. More specifically, it is possible to manufacture the stamper 30 by forming the electrolytic plated layer 31 by Ni and the electroless plated layer 32 by NiB or manufacture the stamper 30 by forming the electrolytic plated layer 31 by Co and the electroless plated layer 32 by CoAg. Also when the above materials are used, if the stamper 30 is manufactured by the method according to the present invention, the portion of the electrolytic plated layer 31 on the side toward the second surface 30b can be sufficiently planarized.

Figure 16:
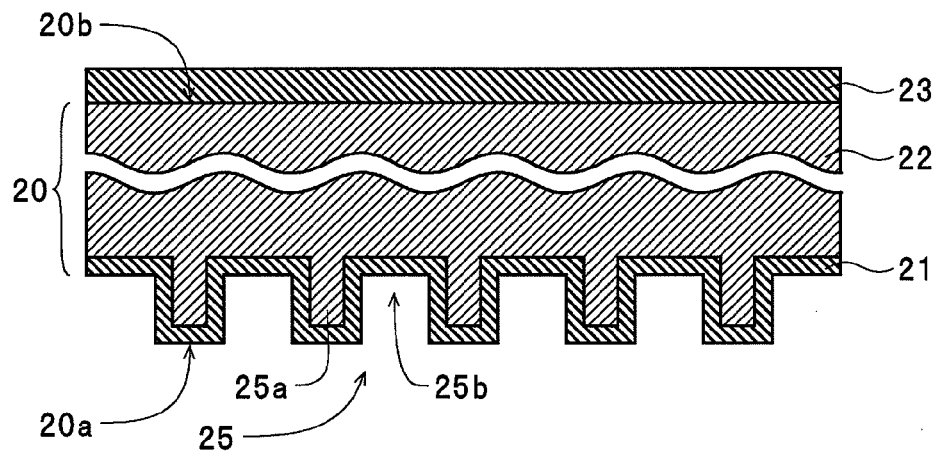
FIG. 16 is a cross-sectional view of the electrode layer and the electrolytic plated layer in a state in which the electroless plated layer is formed on the back surface.

Further, although the description has been given of the example in which the method according to the present invention is carried out so as to manufacture the stamper 30 as a mother stamper, the method according to the present invention and the stamper according to the present invention are not limited to this. More specifically, when the stamper 200 (see FIG. 18) corresponding to another example of the stamper according to the present invention is to be manufactured, the method according to the present invention can be carried out. More specifically, first, as shown in FIG. 16, an electroless plated layer 23 corresponding to a layer having an amorphous structure in the present invention is formed on the aforementioned second surface 20b of the stamper 20 (surface opposite to the first surface 20a formed with the concave/convex pattern 25) by the electroless plating process. In this case, the electroless plated layer 23 may be manufactured using the same material and by the same procedure as employed in manufacturing the electroless plated layer 32 of the stamper 30 described above.

Figure 17:
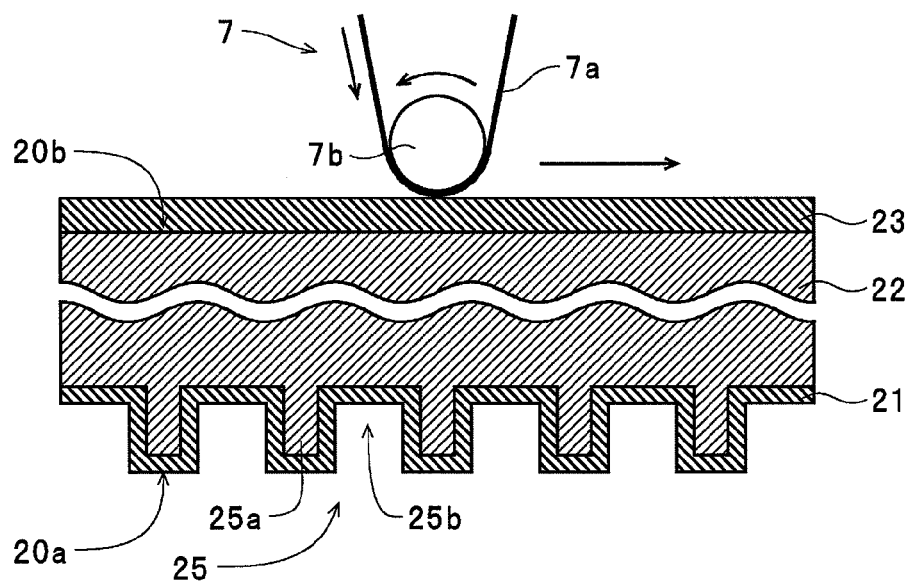
FIG. 17 is a cross-sectional view of the electrode layer and the electrolytic plated layer in a state in which the electroless plated layer is being polished.

Next, as shown in FIG. 17, the stamper 20 having the electroless plated layer 23 formed thereon is set in the polishing apparatus 7, and the surface of the electroless plated layer 23 is polished. In doing this, the surface of the electroless plated layer 23 is polished e.g., under the same conditions as the aforementioned conditions for polishing the electroless plated layer 32 during manufacturing the stamper 30. In this case, similarly to the electroless plated layer 32 of the stamper 30 described above, the electroless plated layer 23 has an amorphous structure since it is formed by using NiP as a plating material. Therefore, unlike the conventional method of manufacturing a stamper which polishes a layer formed by the electrolytic plating process, the electroless plated layer 23 is cut in very small units of loss without being cut such that crystal grains are cut off as units of loss. Thus, as shown in FIG. 18, the second surface 20b is sufficiently planarized in a state where a material (NiP, in the illustrated example) for forming the amorphous structure which forms the electroless plated layer 23 is filled in the depressions of the projections and depressions of the second surface 20b of the stamper 20 (surface of the electrolytic plated layer 22), whereby the stamper 200 is completed.

As described above, according to the method of manufacturing the stamper 200 and the stamper 200, similarly to the method of manufacturing the stamper 30 and the stamper 30, the electroless plated layer 23 having the amorphous structure is polished and thereby planarized, whereby it is possible to prevent the electroless plated layer 23 from being cut such that crystal grains forming the stamper body (the electrolytic plated layer 22 of the stamper 20 formed by the electrode layer 21 and the electrolytic plated layer 22, in the illustrated example) are cut off as units of loss. This makes it possible to obtain a sufficiently favorable surface roughness Ra of the polished electroless plated layer 23. Further, according to the method of manufacturing the stamper 200 and the stamper 200, e.g., compared with the method of manufacturing a stamper which forms a stamper body by the electroless plating process, it is possible to form a stamper body (the electrolytic plated layer 22, in the illustrated example) having a sufficient thickness by the electrolytic plating process in a shorter time period. Therefore, according to the method of manufacturing the stamper 200 and the stamper 200, it is possible to prevent the manufacturing costs of the stamper 200 from being sharply increased due to a longer manufacturing time period. Further, according to the method of manufacturing the stamper 200 and the stamper 200, unlike the method of manufacturing a stamper which forms a stamper body by the electroless plating process, simply by forming a thin layer having the amorphous structure (the electroless plated layer 23), it is possible to make the surface roughness Ra of the thin layer favorable enough, so that irrespective of the magnitude of the stress of the electroless plated layer 23, it is possible to prevent the stamper 200 from being largely warped by the presence of the electroless plated layer 23.

Figure 18:
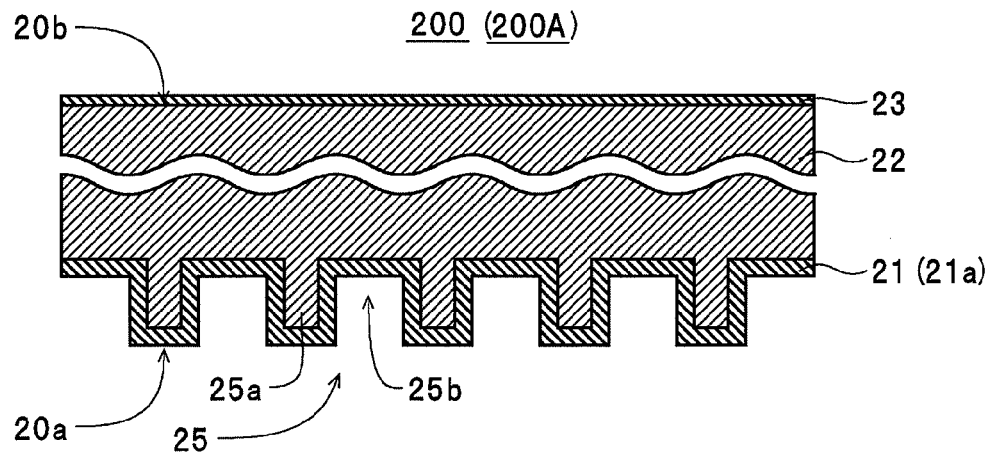
FIG. 18 is a cross-sectional view of the stamper.

Further, although in the stamper 200, the stamper body in the present invention is formed by the electrode layer 21 formed of Ni by the deposition process and the electrolytic plated layer 22 formed of Ni by the electrolytic plating process, as in a stamper 200A shown in FIG. 18, in place of the above-described electrode layer 21 of the stamper 200, e.g., an electrode layer (electroless plated layer) 21a may be formed by the electroless plating process using NiP as a plating material, and then the electrolytic plated layer 22 may be formed of Ni by performing an electrolytic plating process using the electrode layer 21a as an electrode so as to form a stamper body in the present invention. In this case, in the stamper 200A, the electrode layer 21a formed of NiP has an amorphous structure (an example of a stamper in which a portion of a stamper body on a side toward one surface thereof has an amorphous structure).

Further, in the stamper 200A, the electrode layer 21a (portion of the stamper body on a side toward one surface thereof) is formed by the electroless plating process which is lower in the layer growth rate per processing time than the electrolytic plating process, and hence compared with a case where the whole of a stamper body (electrolytic plated layer 31) is formed by the electrolytic plating process as in the above-described stamper 30, a time period required for manufacturing the stamper 200A is slightly longer by the length of a time period required for forming the electrode layer 21a formed by the electroless plating process. However, the electrode layer 21a has a sufficiently small thickness, and the ratio of the electrode layer 21a to the stamper body in the direction of the thickness of the layer is sufficiently small, so that if a portion (the electrolytic plated layer 22) of the stamper body other than the electrode layer 21a is formed by the electrolytic plating process which is higher in the layer growth rate per processing time, it is possible to prevent a time period required for manufacturing the stamper 200A from becoming too long. It should be noted that as in the above-described stamper 200A, when the stamper body in the present invention is formed by a layer having an amorphous structure (the electrode layer 21a, in the illustrated example) and a layer having a crystalline structure (the electrolytic plated layer 22, in the illustrated example), it is preferable that most portions of the stamper body (e.g., as in the above-mentioned stamper 200A, a main portion of the stamper body including part of each convex portion 25a of the concave/convex pattern 25 formed on one surface of the stamper body (a portion except for a portion forming the electrode layer 21a)) is formed by the layer having the crystalline structure (e.g., a layer formed by the electrolytic plating process which is higher in the layer growth rate per processing time).

Furthermore, although in the above-described example, the electroless plated layer 32 corresponding to the layer having the amorphous structure in the present invention is formed by the electroless plating process, this is not limitative, but the layer having the amorphous structure in the present invention can be formed by any of suitable processes, such as sputtering, deposition, and spin coating, in place of the electroless plating process. Further, although in the above-described example, the method of polishing the surface of the electroless plated layer 32 by using the polishing apparatus 7 which polishes an object to be processed, by pressing the polishing tape 7a against the object by the pressing roller 7b, is employed, this is not limitative, but it is possible to polish the surface of the electroless plated layer 32 by various kinds of suitable polishing methods, such as a CMP (Chemical Mechanical Polishing) method, a lapping method, and an electrolytic polishing method.

Further, although the description has been given of the examples in which the stampers 30 and 200 for use in injection molding were manufactured, this is not limitative, but it is also possible to manufacture a metal stamper (not shown) for the imprinting process by the method of manufacturing a stamper according to the present invention. In this case, the imprinting process is carried out using the stamper manufactured by the method of manufacturing a stamper according to the present invention, whereby it is possible to prevent faulty transfer of a concave/convex pattern from being caused by the projections and depressions on the back surface of the stamper as a prototype (prevent degradation of the shape of a concave/convex pattern formed by the imprinting process). In addition, the method of manufacturing a resin molded article according to the present invention is not limited to the method of manufacturing the above-mentioned resin stamper for the imprinting process, but it can be applied to manufacturing of a resin substrate (an example of another resin molded article in the present invention: not shown) for an optical disc and a magneto-optical disk.

What is claimed is:

1. A method of manufacturing a stamper, comprising:
    forming a stamper body such that the stamper body which is plate-shaped and having a concave/convex pattern formed on one surface thereof has at least a side toward the other surface thereof formed to have a crystalline structure;
    forming thereafter a layer having an amorphous structure on the other surface side of the stamper body; and
    polishing thereafter a surface of the layer having the amorphous structure.

2. The method of manufacturing the stamper according to claim 1, wherein a portion of the stamper body having the crystalline structure and the layer having the amorphous structure are formed of materials having a same main component.

3. The method of manufacturing the stamper according to claim 2, wherein the portion of the stamper body having the crystalline structure is formed of Ni, and the layer having the amorphous structure is formed of one of NiP and NiB.

4. A method of manufacturing a resin molded article by carrying out an injection molding process using the stamper manufactured by the method according to claim 1 as a prototype so as to transfer the concave/convex pattern of the stamper to a resin material.

5. A stamper comprising a stamper body which is plate-shaped and is formed such that a concave/convex pattern is formed on one surface thereof and at least a side toward the other surface has a crystalline structure, wherein a layer which has an amorphous structure and a surface of which is polished is formed on the other surface side of the stamper body.

* * * * *